Figure 1:
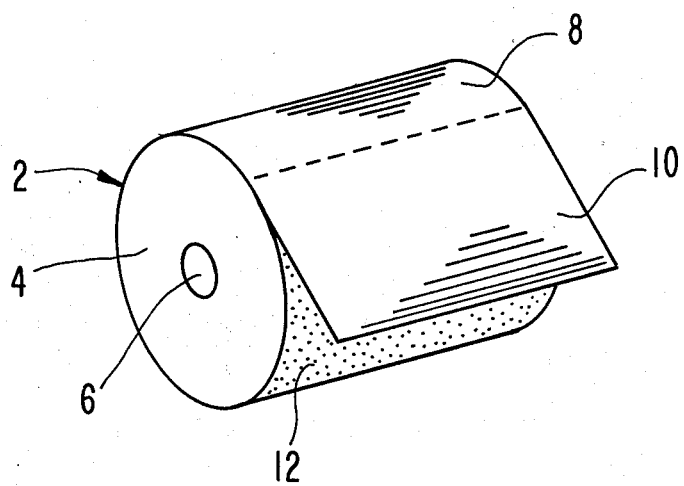

United States Patent [19]  [11] 3,994,396
Reilly et al.  [45] Nov. 30, 1976

[54] TAIL CONTROL AND TRANSFER ADHESIVES FOR ROLLED PAPER PRODUCTS

[75] Inventors: Raymond J. Reilly, Hickory Hills; Howard R. Adamson, Wheaton, both of Ill.

[73] Assignee: Unitech Chemical Inc., Chicago, Ill.

[22] Filed: Oct. 6, 1975

[21] Appl. No.: 619,823

Related U.S. Application Data

[62] Division of Ser. No. 490,727, July 22, 1974, Pat. No. 3,951,890.

[52] U.S. Cl. .................. 206/389; 156/187; 156/328
[51] Int. Cl.² .......................................... B65D 85/672
[58] Field of Search ............ 260/17.4 ST; 206/389, 206/390, 412, 83.5; 156/184, 185, 186, 187, 328, 336; 229/51 WB; 242/1

[56] References Cited
UNITED STATES PATENTS

| | | | |
|---|---|---|---|
| 2,346,791 | 4/1944 | Rummelsburg | 260/17.4 ST |
| 3,275,469 | 9/1966 | Streit | 156/24 M |
| 3,393,105 | 7/1968 | Tellier, Jr. | 156/187 |
| 3,395,789 | 8/1968 | O'Berry et al. | 206/389 |
| 3,454,411 | 7/1969 | Jarowenko et al. | 106/213 |
| 3,505,270 | 4/1970 | Laden | 156/187 |
| 3,532,573 | 10/1970 | Herman | 156/187 |
| 3,592,340 | 7/1971 | Hoev | 206/389 |
| 3,690,981 | 9/1972 | Frank et al. | 156/336 |
| 3,695,965 | 10/1972 | Current et al. | 156/187 |
| 3,755,219 | 8/1973 | Bergomi, Jr. et al. | 260/17.4 ST |
| 3,806,388 | 4/1974 | Contin | 156/184 |
| 3,939,108 | 2/1976 | Sirota et al. | 260/17.4 ST |

*Primary Examiner*—William Price
*Assistant Examiner*—Bruce H. Bernstein
*Attorney, Agent, or Firm*—Edward T. McCabe; Charles E. Bouton; Robert E. Blankenbaker

[57] ABSTRACT

A novel adhesive composition for tail control of rolled paper stock, said composition including a modified starch, polyethylene resin and water. The adhesive is applied onto the paper stock so as to form a non-continuous film.

6 Claims, 2 Drawing Figures

TAIL CONTROL AND TRANSFER ADHESIVES FOR ROLLED PAPER PRODUCTS

This is a division, of application Ser. No. 490,727, filed July 22, 1974, now U.S. Pat. No. 3,951,890.

This invention relates to an improved adhesive composition for use in paper converting, to the process of applying the improved adhesive to rolled paper stock, and to the rolled paper products produced thereby. The adhesive composition of the present invention is a repulpable, easy-release adhesive which has a very high initial wet tack, and which has particular application to tail control of rolled paper products.

In the manufacture of rolled paper products, e.g., paper towels and toilet tissue, parent rolls of paper of up to five feet in diameter and larger are mounted on a piece of equipment called a rewinder or a slitter/rewinder. The parent rolls of paper may have widths of up to 100 feet, and these rolls of paper are rewound through the rewinder apparatus onto cylindrical cores of the same width. Initially, the cylindrical cores are placed on a rotatable mandrel which is indexed through an adhesive application sequence or through a nonadhesive transfer system such as a vacuum system. If an adhesive application sequence is employed, an adhesive known in the art as a transfer adhesive is applied to the cylindrical core at predetermined spacings, usually by means of applicator rollers. Thereafter, the adhesive-carrying core is rotated at the same speed as the paper web being fed through the rewinder from the parent paper roll. Depending upon the type of rewinder equipment, the web speed of the paper ranges up to about 3000 feet per minute. The sheet of paper advancing through the rewinder is then picked up by the rotating, adhesive-carrying core so that the sheet is rewound upon the core. Rewinding continues until a preselected length of paper or preselected roll diameter has been rewound upon the core. At that time, the paper sheet is automatically cut across the entire width, and the loose end of the paper web attached to the parent roll is immediately transferred onto another rotating, adhesive-carrying cylindrical core.

The rewound roll is then slit at predetermined intervals in order to provide final rolled paper products of desired width. For example, the rewound paper roll may be slit into a plurality of rolls of paper towels or rolls of toilet tissue, depending upon the grade of paper rewound. This slitting operation may be carried out either on or off the rewinder apparatus; but whether slitting is contemplated on or off the rewinder, some technique for tail control must be effected prior to the slitting. That is, the tail, which is the last sheet, or sheets, or wrap of the roll of paper wound onto the cylindrical core, must be secured to the rewound paper roll in order to prevent the tail from being loose, unraveled, or unwound during subsequent operations. This invention is operable to "die" the loose paper tail, and the only purpose of such a tail control operation is to prevent unraveling of the paper from the rewound roll until the individual paper product rolls have been packaged. After packaging, there is no need for further tail control. Rather, it is desired that the "tie" bond self-release upon packaging.

Present tail control systems utilize either water, or tape, or adhesives. For very soft and light paper products, such as toilet tissue, water has been used for bonding the paper tail to the completed roll. However, this is not very effective with high speed rewinding systems.

When adhesive tail control is utilized, the adhesive is applied to the rewound paper roll in a preselected pattern by means of sprays, daubers, or spitters. Spitters apply the adhesive in globs, leaving a highly unattractive finished product. Daubers apply the adhesive by means of wheels and also result in an unattractive final product. When used with most adhesives, spray systems (with or without air) also cause a visible deposition of adhesive on the paper.

There are many characteristics which should be possessed by an ideal tail control adhesive. The adhesive should have a very high initial tack for rapid bonding of the tail or outer wrap to the rewound roll. Also, the adhesive should possess release properties such that, upon drying, the bond between the tail or outer wrap and the body of the roll will release, providing ease of roll unwind by the consumer. Moreover, it is important that the adhesive be repulpable; that is, it should be water soluble or water dispersible so that the product can be reworked by the manufacturer if necessary. Additionally, the adhesive must be non-toxic so as not to be detrimental to the consumer. Finally, the adhesive should not stain the paper product and should leave little or no visible deposition thereon, and should not impair the hand or softness of the substrate that has been bonded.

Adhesives presently used for tail control in paper converting do not embody all of the above-mentioned desirable characteristics. For example, hot melt adhesives which have been formulated for tail control usually have good initial tack but frequently possess poor release or unwind properties, poor flexibility, and leave a visible stain on the paper substrate. Moreover, most hot melt adhesives are not repulpable. Other tail control adhesives, which have been formulated for room temperature application, are usually repulpable and have easy-release properties. However, such adhesives usually possess insufficient initial tack for efficient plant operation, especially in high speed rewinding systems. Failure to rapidly and securely bond the tail to the rewound roll often results in the necessity of shutting down the rewinding operation. Finally, present-day paper towel and toilet paper roll products are characterized by tail control adhesives that leave visible adhesive stains and/or leave a visible adhesive deposition on the paper and/or impair the hand and softness of the paper substrate that has been bonded.

It is accordingly a principal object of the present invention to provide an improved adhesive composition for use in tail control of rolled paper stock.

Another object of the present invention is to provide an improved adhesive composition for tail control of rolled substrate material, which adhesive has a high initial tack, has easy-release properties, is repulpable, is non-toxic, leaves no visible deposition or stain upon the substrate, and which does not impair the hand of the substrate.

It is a further object of the present invention to provide an improved process for tail control of rolled paper stock.

It is an additional object of the present invention to provide an improved transfer adhesive composition for application to cylindrical cores for efficient substrate pickup in rewinding operations.

It is also an object of the present invention to provide an improved process for applying the transfer adhesive to cylindrical cores.

Another object of the present invention is to provide improved rolled paper products having the first-wound sheet bonded to a cylindrical core and/or the last-wound sheet or outer wrap bonded to the roll by a repulpable, easy-release adhesive comprising a modified starch and polyethylene resin.

Figure 2:
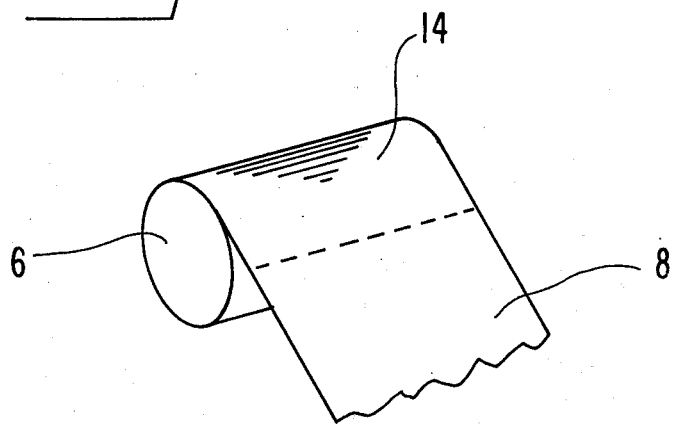

Other objects, features and advantages of the invention will become apparent during the following description thereof, in conjunction with the accompanying drawings wherein:

FIG. 1 is an isometric view of a rolled paper product wound about a cylindrical core; and FIG. 2 is an isometric view of a cylindrical core to which substrate material has been bonded.

Basically, the present invention contemplates an adhesive composition comprising an aqueous dispersion of modified starch and polyethylene resin solids. The adhesive is preferably applied by means of a finely atomized spray or other technique, such that a noncontinuous film is formed on the desired substrate. That is, the adhesive should be applied to the substrate so that it is present as discrete, non-contiguous adhesive particles.

Generally, the present invention is applicable to the rolling of any paper stock or paper substitute, e.g., metal foils and plastic films. The invention has its greatest applicability to the rolling of consumer paper towels, toilet tissue, industrial towels, and gift wrapping paper. However, the invention also is applicable to any type of paper stock which is rolled onto a core or spool; for example, business machine paper, bag stock paper, and printing paper. The invention may also be used with the rolling of consumer plastic films such as polystyrene, cellulose acetate, and polyvinylchloride, as well as thin metals films such as aluminum foil. The language "substrate material" will be used hereafter to denote the inclusion of all of these rollable materials. However, for ease of description, the invention will usually be described in terms of rolled paper products.

As previously mentioned, the adhesive composition of this invention may be used as a transfer adhesive for bonding the first-wound sheet or portion of the substrate material to a cylindrical wrapping core when applied in a non-continuous film. The cylindrical core may be manufactured from any suitable material, such as paperboard, cardboard, chip board, solid bleached sulfate, or plastic. Also, these cores may or may not be laminated, and may or may not comprise a combination of paper material and plastic.

The adhesive composition of this invention is an aqueous dispersion of polyethylene resin and a modified starch selected from the group consisting of borated dextrin, gelatinized starch and pre-gelatinized starch. Dextrin adhesives, starch adhesives and polyethylene adhesives are well-known in the art. Also, adhesives have been prepared by combining dextrin and polyethylene. However, it is believed that the present adhesive comprising a combination of polyethylene and borated dextrin or gelatinized starch or pre-gelatinized starch is novel, and possesses unexpectedly superior properties when utilized in the paper converting art as a tail control or transfer adhesive. Preferably, the adhesive composition comprises from about 30–65 percent water by weight, from about 10–50 percent modified starch by weight, and from about 15–50 percent polyethylene resin emulsion by weight.

The terminology "modified starch" as used in this invention denotes gelatinized starch, pre-gelatinized starch, borated dextrin and mixtures thereof. Gelatinized starch is prepared by cooking starch in water, preferably for about 30 minutes at about 190° F. – 195° F. Starch is relatively insoluble in cold water (tap water), but by gelatinizing the starch it is rendered dispersible or soluble in cold water in excess of 90 percent by weight. It has been found that the gelatinized starch for use with this invention is preferably prepared from waxy corn starch rather than regular corn starch, as this provides a product with greatly enhanced wet tack. Pre-gelatinized starch is a commercially available starch that has been gelatinized and then spray-dried. It can be re-dispersed by merely combining with water and agitating. Again, it is preferred that the pre-gelatinized starch be derived from waxy corn starch.

Dextrin is a partially hydrolyzed starch, and is an intermediate between starch and sugar. Usually it is prepared by acid hydrolysis of starch in an aqueous medium. Hydrolysis is promoted by cooking, and the degree of cooking determines the final solubility of the dextrin product. Solubility of dextrin in cold water ranges from low solubility to essentially completely soluble. It has been discovered, for purposes of the present invention, that the dextrin utilized should be greater than 80 percent soluble in cold water (tap water).

Borated dextrin is prepared by reacting borax with dextrin in an aqueous medium. Borating the dextrin increases tack of the adhesive without appreciably increasing total solids content thereof. The borated dextrin of the present invention may be formed in situ in the adhesive formulation by merely adding borax to an aqueous solution of dextrin. However, it is preferred to add the borax while heating the dextrin solution to a temperature of from about 100° F. to about 180° F. as this results in a superior final product. Borax, preferably $Na_2B_4O_7 \cdot 5H_2O$, should be present in the borated dextrin in the amount of from about 5–15 percent, basis the weight of dextrin, and preferably from about 8 to 12 percent, basis the weight of dextrin. The use of greater than about 15 percent borax may result in an unstable adhesive formulation, whereas the use of less than about 5 percent borax results in an adhesive formulation which does not possess sufficient tack and viscosity.

Since polyethylene resin is not soluble in water, it should be incorporated into the adhesive formulation in the form of a water/polyethylene emulsion or dispersion. These products are well-known in the adhesive art and are available commercially from a variety of sources. They comprise polyethylene resin solids in water, along with a suitable emulsifier. The terminology "polyethylene emulsion" will be used hereafter to refer to both dispersions and emulsions of polyethylene resin solids. These polyethylene emulsions generally contain 25–60 percent resin solids by weight, and usually about 35–45 percent resin solids. Generally, they include the lower density polyethylenes, for example polyethylenes having molecular weights of from 10,000 to 20,000.

It has been discovered that the ratio of polyethylene solids to modified starch solids in the adhesive is important and should vary according to the type of material substrate to which the adhesive will be applied. Thus, for tail control of relatively soft paper stock (toilet tissue) the amount of polyethylene solids present in the adhesive may be as high as 40–80 percent basis the weight of modified starch. On the other hand, if the paper stock is relatively coarse, the adhesive composition may contain as little as 10–30 percent polyethylene solids based on the weight of the modified starch. For almost all rolled material substrates, and particularly paper stock, an adhesive composition containing from about 10–80 percent polyethylene solids basis the weight of modified starch, and preferably from about 20–60 percent polyethylene solids basis the weight of modified starch solids, will be suitable. Polyethylene solids in amounts greater than this result in the adhesive having insufficient tack, and polyethylene solids in amounts less than this result in the adhesive having insufficient release characteristics. The adhesive composition should have a total solids content of from about 25 to 55 percent, and preferably from about 35 to 50 percent, basis weight of the adhesive composition. If the solids content is too high, spraying becomes difficult, and if solids content is too low, tack becomes a problem.

Although it is not essential, it is often desirable that the adhesive formulation contain a minor amount, and preferably from about 0.1 to 1.0 percent of a tack-increasing agent. Preferred tack increasing agents are sodium carbonate and sodium hydroxide. When the modified starch ingredient employed is either gelatinized or pre-gelatinized starch, it is usually desirable to include a minor amount of a starch viscosity stabilizer agent to prevent the starch from "setting-up" during storage. Suitable stabilizers include dicyandiamide and urea. The starch stabilizer should be present in the amount of about 5 to 10 percent basis the weight of starch.

Though not essential, it is often desirable to include minor amounts of a preservative, a wetting agent, a defoaming agent, a chelating agent and/or a film-forming agent in the adhesive formulation. These ingredients may be present in the formulation in amounts of from 0 percent up to about 1.0 percent by weight. A wide range of well-known preservatives are available for imparting greater stability to adhesives during storage. A wetting agent may optionally be added to the adhesive formulation to maximize sprayability. Suitable wetting agents, such as the alkylaryl polyethers, are well-known to those in the art. Defoamers may be incorporated in order to prevent excessive foaming of the adhesive during mixing. A chelating agent, such as EDTA, may be added to bind metal ions so as to improve product color. Film-forming agents such as methyl cellulose can be added to improve film forming properties. Finally, it is sometimes desirable to include an agent which improves adhesive penetration, for example, ethylene glycol. Such agents should generally be present in amounts of up to about 10 percent by weight of the adhesive.

The viscosity of the present adhesive formulation varies with the relative amounts of modified starch, polyethylene resin solids, water, and tack increasing agents present. However, the viscosity will usually range from about 1 poise to about 5000 centipoise (cps). Preferably, however, the adhesive formulation will have a viscosity of from about 200 to 2400 entipoise. If the viscosity is too high, spraying becomes a problem.

We have discovered that, although the present adhesive formulation has excellent easy-release characteristics, release of the bound tails from the rolled product is also a function of the pattern of deposition of the adhesive on the material substrate. Thus it has been noted that even adhesives having superior release-of-bond characteristics will cause fiber tear upon separation of tails from the roll, especially when the adhesive is applied in the form of spots, globs, bands, and continuous films. Application of adhesive in such patterns also results in visible depositions and staining of the paper substrate, as well as impairment of the hand of the paper. We have discovered that application of the present adhesive formulation in a non-continuous film on the substrate obtains remarkably enhanced release of the tails from the rewound roll. Preferably, application of the adhesive in a non-continuous film is achieved by airless spraying of the adhesive through a nozzle. This obtains atomization of the adhesive so that it is deposited on the paper in small, discrete, non-continuous particles. Because of this pattern of deposition, there are no visible adhesive deposits on the paper and there are no visible stains. Moreover, the paper tails remain flexible, and hand is not impaired.

Atomization can be achieved with airless spray nozzles by use of an appropriate spraying pressure. For most airless nozzles, a spraying pressure of from about 500 to 3000 psig is sufficient to obtain desired atomization and a non-continuous deposition of the adhesive. Preferably, the spraying pressure will vary from about 1500 to 2500 psig, depending on the size of the airless nozzle. Increased pressure and increased nozzle size result in increased adhesive deposition for a given unit of spraying time. Conversely, decreased nozzle size and decreased spraying pressure result in a smaller deposition of adhesive for a given unit of spraying time. The deposition of a non-continuous film of adhesive can also be achieved by application of a gravure technique, or by use of an air spray system. However, best results are obtained using an airless spray. It also should be noted that spray systems and gravure techniques can be utilized not only with respect to application of tail control adhesive, but also with respect to application of transfer adhesive to the cylindrical winding cores.

The present adhesive composition is preferably applied under conditions of ambient temperature, such as from 40° to 100° F., although it could be applied at temperatures of up to about 130° F. Normally, the adhesive will be applied at room temperature. Generally, the adhesive is applied to that surface of the substrate tail (inner surface) that will contact and wrap about the rewound roll. Of course, application of the adhesive could be made to the rewound roll itself with subsequent wrap around of the tail to secure same to the roll. Normally, the adhesive is applied to the substrate tail, or roll, substantially simultaneously with cutting of the advancing substrate web and transfer thereof to a new core. After cutting of the substrate sheet, continuing rotation of the rewound roll on the rotatable mandrel causes the adhesive-carrying tail to wrap about the roll, rapidly forming a secure bond of the tail to the roll.

Application of the adhesive, when made on the rewinder, is synchronized with the rewinder so that any desired surface area of the tail can be deposited with a non-continuous film of adhesive. We have found it preferable to apply the non-continuous film across the whole width of the substrate tail and for several inches in length along the tail. For example, the non-continuous film may be applied to the inner surface of one tail sheet when paper towels are being rewound. The amount of adhesive applied is not critical, but should be less than that amount which causes visible depositions and stains. The optimum amount of adhesive to be applied for any given substrate material is best determined by trial and error. Generally, however, a very coarse substrate will require more adhesive than a substrate such as toilet paper.

The adhesive composition, upon application to the substrate, is initially very tacky and forms a secure bond between the tail and the rewound roll. However, after drying through evaporation of moisture, there exists a very weak bond comprised of polyethylene resin solids and modified starch solids. Therefore, the consumer can readily unwind the tail from the roll without tearing of the substrate material.

Referring now to FIGS. 1 and 2, it is seen that a rolled paper product, generally 2, consist of a cylindrical core 6 about which the roll body 4 is wound. The last sheet (tail) 10 of paper web 8 is about to be bonded to roll body 4 by means of the non-continuous, discrete deposition of tail tie adhesive 12. The first wound sheet 14 of paper web 8 has been bonded to cylindrical core 6 by means of a transfer adhesive composition (not shown).

The following examples are presented to illustrate the invention. It wll be understood that those examples are illustrative only, and should not be considered as limiting the invention in any respect.

EXAMPLE I

The following ingredients were thoroughly blended while heating to 130° F.:

|  | % by weight |
| --- | --- |
| Water | 36.15% |
| 95% soluble dextrin | 26.75% |
| Borax | 3.00% |
| 40% solids polyethylene resin emulsion | 30% |
| 14.5% caustic soda solution | 3.35% |
| defoamer | 0.15% |
| preservative | 0.10% |
| wetting agent | 0.50% |

The resulting adhesive composition was applied to toilet tissue paper tails in a non-continuous film by means of an airless spray gun. The adhesive exhibited an extremely high initial tack, and rapidly formed a tail-controlling bond. Upon drying, the adhesive bond between the tail and the roll was surprisingly releasable. Moreover, the adhesive left no visible deposit or stain upon the paper, and did not impair the flexibility or hand of the paper.

EXAMPLE II

The following ingredients were thoroughly blended while heating to 130° F:

|  | Percentage by Weight |
| --- | --- |
| Water | 42.75% |
| 95% Soluble Dextrin | 31.50% |
| Borax | 3.55% |
| 40% Solids Polyethylene Resin Emulsion | 17.50% |
| 14.5% Caustic Soda Solution | 3.95% |
| Defoamer | 0.15% |
| Preservative | 0.10% |

|  | Percentage by Weight |
| --- | --- |
| Wetting Agent | 0.50% |

The resulting adhesive composition was applied to paper towel tails in a non-continuous film by means of an airless spray system. The adhesive exhibited an extremely high initial tack, and immediately formed a tail-controlling bond. Upon drying, the adhesive bond between the tail and the roll was easily releasable. Moreover the adhesive left no visible deposit or stain upon the paper, and did not impair the flexibility or hand of the paper towel.

EXAMPLE III

The following ingredients were thoroughly blended while heating to 190°–195° F.:

|  | Percentage by Weight |
| --- | --- |
| Water | 39.25% |
| Waxy Corn Starch | 26.00% |
| 40% Solids Polyethylene Resin Emulsion | 31.50% |
| Sodium Carbonate | .50% |
| Wetting Agent | 0.50% |
| Dicyandiamide (Starch Viscosity Stabilizer) | 2.00% |
| Chelating Agent | .05% |
| Preservative | .10% |
| Defoamer | .10% |

The waxy corn starch gelatinized in the water during heating at 190°–195° F. The resulting adhesive composition was applied to paper towel tails in a non-continuous film by means of an airless spray system. The concurrence of beneficial characteristics and results observed with the adhesives of Examples I and II were also exhibited by this adhesive composition.

EXAMPLE IV

The following ingredients were thoroughly blended while heating to 190°–195° F.:

|  | Percentage by Weight |
| --- | --- |
| Water | 61.45% |
| Waxy Corn Starch | 10.40% |
| 40% Solids Polyethylene Resin Emulsion | 19.25% |
| Ethylene glycol | 6.65% |
| Methyl cellulose | .80% |
| Dicyandiamide (Starch Viscosity Stabilizer) | .80% |
| Sodium Carbonate | .20% |
| Wetting Agent | .20% |
| Chelating Agent | .05% |
| Defoamer | .10% |
| Preservative | .10% |

The resulting adhesive composition was applied to toilet tissue paper tails in a non-continuous film by means of an airless spray system. This adhesive also exhibited the same beneficial properties and results observed with the adhesive compositions shown in Examples I–III.

It will of course be understood that the optimum adhesive composition will vary within the foregoing guidelines depending upon speed of the rewinding system and upon the type of paper substrate or core material to which the adhesive is being applied. Thus, for a particular substrate material and rewinding system, the optimum properties of initial tack, releasability and sprayability will be obtained through trial and error by adjusting the amounts and types of ingredients in the adhesive in accordance with the foregoing guidelines.

Obviously, many modification and variations of the invention as hereinbefore set forth may be made without departing from the spirit and scope thereof, and therefore, only such limitations should be imposed as are indicated in the appended claims.

We claim:

1. An improved rolled substrate material product comprising a web of substrate material rolled onto a cylindrical core, the tail of said rolled substrate material being releasably bonded to the roll by a non-continuous film of a repulpable, easy-release adhesive composition comprising polyethylene resin solids and a modified starch selected from the group consisting of borated dextrin, gelatinized starch, pregelantinized starch, and mixtures thereof, and wherein said resin solids are present in the amount of from about 10–80 percent basis the weight of modified starch.

2. The product of claim 1 wherein the substrate material is paper.

3. The product of claim 1 wherein the substrate material is toilet tissue.

4. The product of claim 1 wherein the substrate material is paper towels.

5. The product of claim 1 wherein the first-wound portion of substrate material is releasably bonded to the cylindrical core by a non-continuous film of a repulpable easy-release adhesive composition comprising polyethylene resin solids and a modified starch selected from the group consisting of borated dextrin, gelatinized starch, pre-gelatinized starch and mixtures thereof, and wherein said resin solids are present in the amount of from about 10–80 percent basis the weight of modified starch.

6. The product of claim 5 wherein the substrate material is paper.

* * * * *